United States Patent [19]

Delaval et al.

[11] Patent Number: 5,714,244
[45] Date of Patent: Feb. 3, 1998

[54] METHOD FOR PROTECTING A POROUS CARBON-CONTAINING MATERIAL FROM OXIDATION, AND MATERIAL OBTAINED THEREBY

[75] Inventors: Rodolphe Delaval, St. Martin au Laërt; Gérard Palavit, Douai; Jacques Rey, Merignac; Michel Laxague; Jacques Thebault, both of Bordeaux, all of France

[73] Assignee: Societe Europeenne de Propulsion, Suresnes, France

[21] Appl. No.: 564,133

[22] PCT Filed: Apr. 5, 1995

[86] PCT No.: PCT/FR95/00432

§ 371 Date: Nov. 30, 1995

§ 102(e) Date: Nov. 30, 1995

[87] PCT Pub. No.: WO95/26934

PCT Pub. Date: Oct. 12, 1995

[30] Foreign Application Priority Data

Apr. 5, 1994 [FR] France ................... 94 03971

[51] Int. Cl.[6] ................................................ C04B 41/89
[52] U.S. Cl. .................. 428/307.7; 427/343; 427/372; 427/375; 427/376.1; 427/376.2; 428/306.6; 428/307.3; 428/408; 428/426; 428/701; 428/702; 501/44; 501/45; 501/46
[58] Field of Search ......................... 428/408, 426, 428/701, 702, 306.6, 307.3, 307.7; 501/44, 45, 46; 427/343, 372, 375, 376.1, 376.2

[56] References Cited

U.S. PATENT DOCUMENTS

| | | | |
|---|---|---|---|
| 3,708,317 | 1/1973 | Owen et al. | 428/408 |
| 3,885,973 | 5/1975 | Ray et al. | 106/47 R |
| 3,979,322 | 9/1976 | Alexeev et al. | 252/301.6 P |
| 4,229,220 | 10/1980 | Hiroto | 106/47 R |
| 4,391,915 | 7/1983 | Meden-Piesslinger et al. | 501/46 |
| 4,439,491 | 3/1984 | Wilson | 428/408 |
| 4,487,804 | 12/1984 | Reven | 428/408 |
| 4,771,020 | 9/1988 | Omata et al. | 501/44 |
| 4,837,073 | 6/1989 | McAllister et al. | 428/408 |
| 4,929,387 | 5/1990 | Hayden et al. | 501/45 |
| 4,940,677 | 7/1990 | Beall et al. | 501/45 |
| 4,996,172 | 2/1991 | Beall et al. | 501/45 |
| 5,071,795 | 12/1991 | Beall et al. | 501/44 |
| 5,102,698 | 4/1992 | Cavalier et al. | 428/408 |
| 5,122,484 | 6/1992 | Beall et al. | 501/46 |
| 5,196,381 | 3/1993 | Hu et al. | 501/46 |
| 5,401,440 | 3/1995 | Stover et al. | 428/408 |

*Primary Examiner*—Archene Turner
*Attorney, Agent, or Firm*—Weingarten, Schurgin, Gagnebin & Hayes LLP

[57] ABSTRACT

A material is impregnated with an aqueous solution containing precursors of a glass-containing phosphate base modified at least by the presence of zinc oxide, then dried and heat treated to form an internal oxidation protection constituted by the modified phosphate glass-containing base. The precursors are introduced into the aqueous solution so as to form a glass-containing base in which the molar ratio between the glass modifying oxides, comprising zinc oxide, and the glass forming oxides, principally comprising or consisting of phosphoric anhydride, is sufficiently high, in particular at least 0.6, preferably 0.9, to confer a resistance to corrosion by moisture on the glass-containing phosphate base. The solution is formed by first dissolving in water, a polyphosphate such as sodium metaphosphate or trimetaphosphate which can allow the subsequent dissolution, by stable complexing without forming a precipitate, of the required quantity of precursor salts for the modifying oxides comprising at least one zinc salt such as zinc nitrate or sulfate.

29 Claims, No Drawings

METHOD FOR PROTECTING A POROUS CARBON-CONTAINING MATERIAL FROM OXIDATION, AND MATERIAL OBTAINED THEREBY

The present invention concerns the protection of porous carbon-containing materials against oxidation and catalytic oxidation of the carbon.

The field of the invention is that of carbon-containing porous materials for use at temperatures above the temperature at which oxidation of carbon commences, i.e., about 350° C., up to about 1000° C.

These materials are solid materials such as porous graphites and carbons, and also composite carbon-containing materials. In particular, these latter materials are composite materials constituted by reinforcing fibers densified by a matrix, carbon being present in the fibers, in the matrix and/or in a matching or interphase layer between the fibers and the matrix. In particular, composite materials of this type are thermostructural composite materials in which the reinforcing fibers and the matrix are formed from carbon or a ceramic with the possible interposition of a pyrolytic carbon interphase between the fibers and the matrix. These materials are characterized by their good mechanical properties. When they contain carbon, retaining these properties at high temperature in an oxidizing environment requires the presence of effective protection against oxidation. This is also the case when the carbon is present only in a pyrolytic carbon interphase between ceramic reinforcing fibers and a ceramic matrix, where the interphase is essential to the mechanical properties of the material, as described in European patent EP-0 172 082. Further, regardless of the manufacturing process used for thermostructural composite materials—densification from a liquid consisting of impregnating the reinforcing fibers with a precursor and then transforming the precursor by heat treatment, or densification by chemical vapor infiltration—the materials obtained have a residual open pore space, giving oxygen from the surroundings access to the core of the material.

Thus a first aim of the invention is to provide effective protection against oxidation to solid or composite carbon-containing materials with an internal pore space which is accessible from the outside.

A further aim of the invention is to provide effective protection against catalytic oxidation of carbon.

The reaction between carbon and oxygen is known to be accelerated by the presence of certain elements, such as alkalis and alkaline-earths, which are introduced by or provided by, for example, sodium chloride (sea water), potassium acetate, etc., which act as oxidation catalysts. These catalysts may be impurities from the surroundings (pollution, soiling, exposure to a marine environment, etc.) or impurities from a manufacturing process, for example residues from the manufacture of carbon fibers (precursors, sizing substances added prior to weaving).

A well-known process for protecting a carbon-containing material against oxidation consists of forming a coating which constitutes a barrier against oxygen from its surroundings. When the material is used at a relatively high temperature and/or is subjected to large stresses, it is important to prevent cracks or faults in the protective barrier due to differential thermal expansion or mechanical strain from allowing access for oxygen. Therefore, self-healing oxidation protection, or protection which is completed by an additional covering layer with such a property, is also used. The term "self-healing" here means the ability to fill in automatically any crack of fault which may appear during use of the material.

Coatings in the form of glasses are used to constitute self-healing protection for materials for use at relatively high temperatures. By becoming viscous at the working temperature of the material to be protected, glasses are able to fill in any cracks. The composition of the glass is selected so that it has the desired viscous character at the intended working temperature. The publication "Ceramic Coatings for Carbon Materials" by James E. Sheehan in "Proceedings of the Fourth Annual Conference on Materials Technology", May 5, 1987, reviews different types of glasses which may be suitable depending on the working temperature.

In the field of the present invention, i.e., at temperatures reaching a maximum of 1000° C., glasses with a low melting point are suitable, i.e., glasses with a glass transition temperature $T_g$ of not greater than 500° C. When effective oxidation protection is required from the temperature at which oxidation of carbon commences, it may be relatively low, from 250° C. to 350° C. It may be slightly higher, for example about 450° C. to 500° C., depending on the working temperature range of the material, and providing an absence of a self-healing function between 350° C. and 450° C. to 500° C. is tolerable since the oxidation kinetics of carbon are still fairly slow. Since the effective range of the glass, i.e., the range in which self-healing is effective, is about 500° C., a value of $T_g$ of 250° C. to 350° C. can provide protection up to about 750° C. to 850° C., while a value of $T_g$ of 450° C. to 500° C. provides protection up to about 950° C. to 1000° C. Examples of glasses with low melting points which appear to be particularly suitable are phosphate based glasses, i.e., glasses in which the principal glass forming oxide is $P_2O_5$. Further, it is known that phosphates, whether glasses or not, also have anti-catalytic activity as regards the catalytic oxidation of carbon. Thus phosphates can inhibit the effect of catalytic agents present in contact with a material to be protected, thereby returning the oxidation kinetics to that of pure carbon. As a consequence, phosphate based glasses can both counter the action of the catalyst and act as a self-healing barrier.

With porous materials, effective oxidation protection is achieved when the protective barrier is fixed inside the internal pore space of the material, i.e., the walls of pores which are accessible from the outside (the actual surface of the material) are lined, rather than the protection simply being constituted by a layer coating the outside surface.

The production of an internal anti-oxidation protection in porous carbon-containing materials by impregnating these materials with compositions which can leave a phosphate based coating on the walls of pores accessible from the exterior is described in particular in U.S. Pat. Nos. 3,351,477, 4,292,345 and in French patent FR-A-2 685 694.

U.S. Pat. No. 3,351,477 describes the use of an impregnating composition constituted by a relatively concentrated aqueous solution, and stipulates a particular order of introducing the precursors for the phosphate coating to be produced. Thus, dissolution of the precursors begins with phosphoric acid whose presence allows the other precursors to dissolve, but to a limited degree. This results in the formation of a phosphate coating which is sensitive to moisture. In addition, during the heat treatment which transforms the precursors, the phosphoric acid has a tendency to volatilize, making it difficult to fix the final composition and thus to fix the properties of the phosphate coating produced.

U.S. Pat. No. 4,292,345 describes impregnation in several steps, firstly with orthophosphoric acid which is dried, then with a solution of an organic compound which, after raising the temperature, can react with the phosphoric acid to form phosphates. In addition to the fact that at least two successive impregnation steps are necessary, followed by heat treatment, there is the problem mentioned above of the sensitivity to moisture of the phosphate coating produced.

FR-A-2 685 694 describes impregnating a composite material with a liquid solution of sodium and potassium phosphates, before drying and heat treatment to form an internal protective layer against oxidation which covers the surfaces of the open pores in the material. The protection obtained is again too sensitive to moisture.

The modification of phosphate based glasses to reduce their sensitivity to corrosion by moisture, in this context glasses in which phosphoric anhydride $P_2O_5$ is the principal oxide forming the glass matrix, has already been studied.

A known solution, described by L. Montague et al. in "Journal of Non-crystalline Solids", 155, (1993), April, No 2, Amsterdam, NL, pp. 115–121, consists of incorporating a modifying oxide precursor, in this case alumina, into a polyphosphate solution to obtain a gel, from which a phosphate based glass with an increased resistance to moisture corrosion can be produced.

Another known solution, described in particular in EP-A-0 365 235, also consists of adding modifying oxides, in particular zinc oxide ZnO, and producing the glass by melting a mixture of its different constituents.

It is possible to envisage the use of modified phosphate type glass bases to form an internal oxidation protection which is less sensitive to moisture in porous carbon-containing materials. However, the problem is how to obtain this protection.

The use of a polyphosphate in gel form, as described in the article cited above, is not possible since impregnation into the pore space of the material is impossible.

Impregnation of the porous material to be protected with a melted glass-containing base can also be envisaged. However, this raises problems. Firstly, it would be necessary to operate under pressure and at a high temperature, which would render the process complex and costly. Secondly, the pores in the materials, whether carbon or solid graphite or a densified composite material, are small, so deep impregnation requires an impregnating composition with low viscosity, less than that of molten glass.

A further possibility could consist of introducing the constituents of the modified phosphate type glass-containing base, or its precursors, in the form of powders suspended in a liquid vehicle, impregnating the porous material with this suspension, then forming the glass-containing base by heat treatment, after drying the impregnated material. Here again, the pores have dimensions which are too small to allow deep infiltration by the solid particles.

For the applications envisaged by the present invention, the most suitable technique thus appears to be impregnation of the porous material by a completely dissolved aqueous solution of precursors of the desired phosphate type glass-containing base.

The use of an aqueous solution of phosphate based glass precursors has been described in U.S. Pat. No. 3,351,477 cited above. However, the glass obtained is sensitive to moisture. It does contain a certain amount of modifying oxide ZnO, but in an insufficient amount to render it insensitive to moisture. Further, the method described in that document does not allow the relative quantity of zinc oxide or its precursor in the form of zinc phosphate in the impregnating solution to be increased sufficiently for the zinc oxide to be present in the phosphate based glass in a sufficient proportion to significantly reduce the sensitivity to moisture. Tests carried out by us have shown that attempts to increase the quantities of zinc oxide or phosphate in the impregnating solution render it unstable and lead to the formation of phosphate precipitates.

The aim of the present invention is to provide a process which can form an internal oxidation protection in the form of a phosphate type glass-containing base which is highly insensitive to moisture in a porous carbon-containing material, by impregnating the material with an aqueous solution of precursors for the glass-containing base. A further aim is to carry out the impregnation with an aqueous solution in which the concentration of precursors is as high as possible to obtain a high degree of impregnation and produce the desired internal protection in a single impregnation step.

This aim is achieved by a process for the protection of a porous carbon-containing material against oxidation and catalytic oxidation of carbon, comprising the steps consisting of:

preparing an aqueous solution containing the precursors of a glass-containing phosphate base modified at least by the presence of zinc oxide;

impregnating the porous material with the aqueous solution such that it penetrates the accessible pore space of the material;

drying the impregnated material; and carrying out heat treatment to form an internal coating which protects against oxidation, constituted by said modified phosphate glass-containing base, in which process, according to the invention, the precursors are introduced into the aqueous solution so as to allow the formation of a glass-containing base in which the molar ratio between the glass modifying oxides, comprising zinc oxide, and the glass forming oxides, principally comprising or consisting of phosphoric anhydride, is sufficiently high to confer a resistance to corrosion by moisture on the glass-containing phosphate base, and the solution is formed by firstly dissolving in water, a polyphosphate which can then allow the required quantity of precursor salts of the modifying oxides comprising at least one zinc salt to dissolve to form a stable solution without the formation of a precipitate.

The term "glass-containing phosphate base" here means both a phosphate based glass and a phosphate based composition which, on melting, behaves as a glass but in which a crystalline phase may appear on cooling and/or with time, leading to partial devitrification (a glass containing crystal grains).

The molar ratio between the modifying oxides and the glass forming oxides which must be achieved to obtain high resistance to corrosion by moisture depends on the nature of the constituents of the glass-containing base, in particular the modifying oxides present with the zinc oxide. In a $ZnO/P_2O_5$ system, the molar ratio between the ZnO and the $P_2O_5$ is preferably greater than one. In fact, the corrosion rate is divided by a factor of about 100 when the molar ratio between ZnO and $P_2O_5$ passes from a value slightly below one to a value slightly greater than one. In a system comprising other forming and/or modifying oxides in addition to ZnO and $P_2O_5$, the minimum value of the molar ratio between the modifying oxides and the forming oxides can be less than one. It appears, however, to be preferable that this ratio is at least 0.6 at all times, and better still at least 0.9.

The choice of the phosphate which is dissolved first in the water is essential in order to allow the subsequent dissolution of the desired quantity of precursor salts of the modifying oxides, and also to produce a high concentration of all the precursors in the solution, without compromising its stability. Phosphoric acid is excluded, as this cannot produce a stable solution with the desired proportions and concentrations of modifying oxide precursor salts. Thus, while in U.S. Pat. No. 3,351,477 cited above, a high concentration of precursors in the impregnating solution without compromising the stability of the solution was sought, the fact that phosphoric acid is dissolved first means that the molar ratio between ZnO and $P_2O_5$ can only reach 0.5, i.e., a value which is far too low to produce good resistance to corrosion by moisture in the internal protection produced. Further, phosphoric acid can be unstable during heat treatment and its residual presence in the glass also tends to limit moisture resistance.

The phosphate which is dissolved first is a polyphosphate, advantageously sodium metaphosphate or sodium trimetaphosphate, which allows the required proportion of precursors to dissolve by complexing the cations which are subsequently produced.

The precursor salt for zinc oxide, preferably zinc nitrate or zinc sulfate, is introduced next into the solution.

It is thus possible to obtain a completely dissolved, stable impregnating solution with a high concentration of precursors for the glass-containing base, the proportion by weight of these precursors in the solution being greater than or equal to 50%.

The viscosity of the solution must, however, be sufficiently low to allow deep impregnation into the material, in particular when the accessible open pore space has small dimensions, as is the case for solid carbons and graphites or carbon-containing composites. The viscosity is typically in the range 0.1 dPa.s to 10 dPa.s, preferably in the range 0.1 dPa.s to 1 dPa.s.

The stability of the solution can be improved still further while keeping the acidity fairly high, preferably at a pH of less than 0.5. This acidity is achieved by adding suitable oxide precursors, for example potassium dihydrogen phosphate, boric acid, ammonium phosphate etc., but excluding phosphoric acid.

In order to improve the stability, one or more organic stabilizing agents with a fugitive nature can be added to the precursors, i.e., totally eliminated during the final heat treatment. Particular examples of these fugitive stabilizing agents are oxalic acid, tartaric acid and citric acid.

Other precursors are added to the solution depending on the desired composition of the glass-containing base, for example oxide precursors such as: copper, cobalt, nickel, iron, magnesium and/or lead oxides, lithium and/or potassium oxide precursors, bismuth, aluminium and/or boron oxide precursors and vanadium and/or titanium oxide precursors.

In order to obtain the desired proportion of phosphoric anhydride in the glass-containing base, a precursor of this oxide, for example ammonium phosphate, but excluding phosphoric acid, can be added to the solution.

A further object of the invention is provided by a porous carbon-containing material provided with an internal oxidation protection and catalytic oxidation of carbon, the internal protection being constituted by a layer fixed in the pore space of the material and formed by a glass-containing phosphate base modified at least by the presence of zinc oxide, in which material, in accordance with the invention, the glass-containing base has the following composition, in moles of oxides:

20% to 60%, preferably 20% to 50%, of $P_2O_5$;
10% to 30% of ZnO;
10% to 30% of $Na_2O$;
0 to 20% of at least one oxide selected from CuO, CoO, NiO, FeO, MgO and PbO;
0 to 15% of at least one alkali metal oxide selected from $Li_2O$ and $K_2O$;
0 to 20%, preferably 0 to 15%, of at least one oxide selected from $Bi_2O_3$, $Al_2O_3$ and $B_2O_3$; and
0 to 5% of at least one oxide selected from $V_2O_5$ and $TiO_2$, with a molar ratio between the modifying oxides, comprising zinc oxide, and the forming oxides, principally comprising or consisting of phosphoric anhydride, which is sufficiently high to confer a resistance to corrosion by moisture on the glass-containing phosphate base.

While glass-containing phosphate base compositions comprising modifying oxides to improve the resistance to moisture are known, the invention is remarkable in that the deposit is fixed in the core of the accessible pore space of the porous material to be protected, to constitute an internal protection covering the surfaces of the open pores.

In the composition defined above, in addition to phosphoric anhydride $P_2O_5$ which constitutes the principal or unique glass forming oxide, other oxides which are normally formers which may be present are boron oxide $B_2O_3$ and vanadium oxide $V_2O_5$, the other oxides being the modifying oxides.

The nature and respective quantities of the constituents of the solution used to impregnate the material to be protected are selected depending on the desired composition of the glass-containing base and the possibility of introducing these constituents in the required quantities into a stable aqueous solution.

As already indicated, the presence of modifying oxides in large proportions in the glass-containing base is indispensable in order to produce the desired moisture resistance. This means that relatively high quantities of precursor salts of the modifying oxides must be introduced. In the invention, this is rendered possible by firstly dissolving a polyphosphate in the water which, by complexing, allows subsequent dissolution of these quantities of the precursor salts, in particular a zinc salt. More particularly, a polyphosphate such as sodium metaphosphate $NaPO_3$ or sodium trimetaphosphate is employed.

$P_2O_5$ may also be provided by the presence of other phosphates such as ammonium phosphate $NH_4H_2PO_4$ or potassium phosphate $KH_2PO_4$, the latter also being capable of maintaining the desired acidity for the stability of the solution.

The precursor of $B_2O_3$ is, for example, boric acid $H_3BO_3$, and that of $V_2O_3$ may be ammonium vanadate $NH_4VO_3$.

The precursors for the metallic oxides, in particular ZnO, and the alkali metal oxides are, for example, nitrates or sulfates. Preferably, the ZnO precursor is zinc nitrate $Zn(NO_3)_2.6H_2O$. The combination of sodium metaphosphate and zinc nitrate has the particular characteristic of forming a complex which then prevents the $Zn^{2+}$ cation which would be produced if a different method were used, from precipitating long chains of sodium phosphate.

Examples which illustrate the effectiveness of the present invention are described below. In all the examples, the aqueous solution of glass-containing base precursors is produced by firstly introducing into water, a condensed phosphate, in these examples sodium metaphosphate, then secondly a ZnO precursor salt, in these examples $Zn(NO_3)_2.6H_2O$, the subsequent order of introduction of the remaining precursors being less critical.

Impregnation of the material to be protected is, for example, carried out at room temperature by immersing the material in a bath of the aqueous solution of precursors which has a viscosity in the range 0.1 dPa.s to 10 dPa.s. A vacuum is established before or after immersion, or an overpressure is established after immersion, in order to allow the solution to infiltrate the accessible pore space of the material.

After drying to eliminate the water from the solution, for example in an oven, heat treatment is carried out so that the glass-containing base composition can reach its physico-chemical equilibrium. For the glass-containing bases used in the present invention, heat treatment is carried out at a temperature of about 350° C. to 950° C.

Heat treatment is preferably carried out in a neutral atmosphere, for example in nitrogen ($N_2$). It can also be carried out in a reactive atmosphere, for example a nitriding atmosphere, in ammonia which may contain additional hydrogen ($NH_3+H_2$); nitriding of the glass-containing base may further increase its resistance to corrosion by moisture.

EXAMPLE 1

This example compares the resistance to moisture of a glass (glass 1) with a composition which is that of a prior art internal protective coating against oxidation, more precisely that described in French patent FR-A-2 685 694 described above, with the moisture resistance of glasses (glasses 2 and 3) with compositions which are those of an internal protective coating against oxidation formed in accordance with the invention.

Table 1 below shows the compositions of the solutions produced to obtain glasses 1, 2 and 3, also the order of introduction of the precursors for glasses 2 and 3. For each solution, the precursors were dissolved in 30 cm³ of water. The concentrations of the precursor solutions are also shown, along with the glass yield of each solution.

The solutions produced remained stable and clear for several days.

After oven drying, the paste recovered from each solution was gradually raised to a temperature of about 900° C. for one hour in a refractory crucible in a neutral atmosphere, during which phase the precursors were transformed into a glass. Glasses 1, 2 and 3 obtained were poured into solid rods with a mass of about 3 grams (g), into a solid carbon mould.

Table II below shows the composition, in molar percentages of oxides, of glasses 1, 2, and 3, and their transition temperature $T_g$.

The glass rods were each immersed in 100 ml of water at 100° C. Glass rod 1 had completely dissolved after 10 minutes. Glass rods 2 and 3 were left for one hour and the weight loss was measured. Table II indicates the corrosion rates for the glasses as a percentage loss per minute.

One can note that forming a glass with a process according to the invention allows a quite significant increase in the resistance to corrosion by moisture, while retaining the use of a stable and concentrated aqueous solution with high efficiency and low melting point.

TABLE II

| Constitution in molar % of oxides | Glass 1 | Glass 2 | Glass 3 |
| --- | --- | --- | --- |
| $P_2O_5$ | 50 | 37.4 | 46.5 |
| ZnO |  | 25.2 | 20.4 |
| $Na_2O$ | 38.6 | 28 | 5.1 |
| $K_2O$ | 11.4 | 9.3 | 7.6 |
| $Li_2O$ |  |  | 7.6 |
| $B_2O_3$ |  |  | 3.8 |
| $T_g$(°C.) | 270 | 270 | 270 |
| Corrosion rate (% wt/min) | 10 | 0.2 | 0.1 |

EXAMPLE 2

This example shows the effectiveness of an internal protection obtained in accordance with the invention against oxidation and catalytic oxidation of carbon.

Parallelepipedal samples of carbon-carbon composite material with a residual open pore space of about 10% by volume and dimensions of 25'20'6 mm³ were vacuum impregnated at room temperature with an aqueous solution with the following composition in weight percent (the figure in parentheses indicates the order of introduction of the precursors):

TABLE I

| Precursors | Glass solution 1 Composition of precursors (g) | Glass solution 2 Composition of precursors (g) | Glass solution 2 Order of introduction of precursors | Glass solution 3 Composition of precursors (g) | Glass solution 3 Order of introduction of precursors |
| --- | --- | --- | --- | --- | --- |
| $NaH_2PO_4$ | 22.5 |  |  |  |  |
| $NaPO_3$ |  | 12.2 | 1 | 6.8 | 1 |
| $Zn(NO_3)_2$, |  | 15.8 | 2 | 13.4 | 2 |
| $6H_2O$ |  |  |  | 2.3 | 3 |
| $LiNO_3$ | 7.5 | 5.5 | 3 | 4.6 | 4 |
| $KH_2PO_4$ |  |  |  | 11.6 | 5 |
| $NH_4H_2PO_4$ |  |  |  | 1 | 6 |
| $H_3BO_3$ |  |  |  |  |  |
| Concentration of precursors (g/l) | 1000 | 1000 |  | 1000 |  |
| Glass yield (g/l) | 850 | 600 |  | 650 |  |

| | |
|---|---|
| H₂O | 42.5% |
| NaPO₃(1) | 16.6% |
| Zn(NO₃)₂,6H₂O(2) | 20.7% |
| KH₂PO₄(3) | 6.5% |
| H₃BO₃(4) | 1.6% |
| H₆NPO₄(5) | 12.1% |

The samples were then oven dried and heat treated in a neutral atmosphere at a temperature of about 750° C.

The composition obtained (glass 4) had the following molar percentages of oxides:

| | |
|---|---|
| P₂O₅ | 45.6% |
| ZnO | 20.2% |
| Na₂O | 23.5% |
| K₂O | 6.9% |
| B₂O₃ | 3.8% | which gave a molar ratio between the modifying oxides and the forming oxides (P₂O₅ and B₂O₃) of about 1.02.

The relative weight of glass in the samples was about 2%.

After heat treatment and returning to room temperature, some samples were impregnated with a potassium acetate solution which acted as a catalyst for the oxidation of carbon.

Those samples which had the internal oxidation protection constituted by the above glass, with no pollution by potassium acetate (samples A) and with pollution by potassium acetate (samples B) were kept in air at 650° C. for 5 hours. By way of comparison, the same carbon-carbon samples without oxidation protection, with no pollution by potassium acetate (samples C) and with pollution by potassium acetate (samples D) underwent the same oxidation treatment. Following this, the average relative weight loss for each series of samples was measured, giving the following results:

| | |
|---|---|
| samples A | 0.1% |
| samples B | 0.3% |
| samples C | 5% |
| samples D | 99% |

The effectiveness of the oxidation protection of the invention can thus be seen, even in the presence of a catalyst.

EXAMPLE 3

This example shows the homogeneity of the oxidation protection in the volume of the treated piece.

A cylindrical piece of a carbon-carbon composite material of diameter 160 mm and thickness 30 mm, with a residual open pore space of about 10% by volume, was provided with an internal oxidation protection as described in Example 2. Parallelepipedal samples with dimensions of 25'20'6 mm³ were taken from the center of the cylinder and impregnated with a solution of a carbon oxidation catalyst (in this case potassium acetate). The treated samples were then kept in air at 650° C. for 5 hours. The average relative weight loss was 0.7%.

While this was greater than that measured for the B samples in Example 2, this weight loss was far lower than that measured with the unprotected samples (samples C and D of Example 2), demonstrating the efficacy of the protection in the bulk of the material. This is due to the ability of the impregnating solution to impregnate the open pore space of the material right to its core, and means that pieces constituted by this material can be machined after the protective treatment.

EXAMPLE 4

This example shows the possibility of adjusting the composition of the glass to improve one of its properties or provide it with a particular property, by addition of a suitable precursor.

In this example, the wetting power of the glass on a carbon surface was to be improved in order to complete its protective function. This was achieved by adding vanadium oxide V₂O₅ to the glass composition.

An aqueous solution was used with the following composition in weight percent (the figure in parentheses indicates the order of introduction of the precursors into the solution):

| | |
|---|---|
| H₂O | 42.7% |
| NaPO₃(1) | 16.1% |
| Zn(NO₃)₂,6H₂O(2) | 20.1% |
| KH₂PO₄(3) | 6.3% |
| H₃BO₃(4) | 1.6% |
| NH₄H₂PO₄(5) | 11.7% |
| NH₄VO₃(6) | 1.5% |

The composition obtained (glass 5) had the following molar percentages of oxides:

| | |
|---|---|
| P₂O₅ | 44.8% |
| ZnO | 19.8% |
| Na₂O | 23% |
| K₂O | 6.8% |
| B₂O₃ | 3.7% |
| V₂O₅ | 1.9% | which gave a molar ratio between the modifying oxides and the forming oxides (P₂O₅, B₂O₃, V₂O₅) of about 0.99.

In general, better distribution of protection was observed in the material and on the material.

EXAMPLE 5

Again with the aim of adjusting the composition to improve one of its properties, this time the resistance of the glass to corrosion by water was increased with copper oxide CuO.

An aqueous solution was prepared with the following composition by weight (the figure in parentheses indicates the order of introduction of the precursors into the solution):

| | |
|---|---|
| H₂O | 30 g |
| NaPO₃(1) | 12.2 g |
| Zn(NO₃)₂,6H₂O(2) | 15.8 g |
| KH₂PO₄(3) | 5.5 g |
| CuSO₄,3H₂O(4) | 12.2 g |

The composition obtained (glass 6) had the following molar percentages of oxides:

| | |
|---|---|
| P₂O₅ | 30.4% |
| ZnO | 20% |
| CuO | 19.2% |

| | |
|---|---|
| Na$_2$O | 22.8% |
| K$_2$O | 7.6% | which gave a molar ratio between the modifying oxides and the forming oxide (P$_2$O$_5$) of about 2.3.

As in Example 1, the glass was moulded into a solid rod and kept for one hour in 100 ml of water at 100° C. The corrosion rate measured, expressed as a relative weight loss, was about 2'10$^{-4}$% per minute, which was far lower than the values obtained with glasses 2 and 3 in Example 1.

EXAMPLE 6

Again, this example sought to increase the resistance to corrosion by water, while maintaining a high level of oxidation protection.

A 50% concentrated solution of aluminium dihydrogen phosphate AlH$_2$PO$_4$ was added to a solution prepared as described in Example 2, in a proportion of 30% by weight. After heat treatment, the composition obtained (glass 7) had the following molar percentages of oxides:

| | |
|---|---|
| P$_2$O$_5$ | 46.3% |
| ZnO | 16.2% |
| Na$_2$O | 20.3% |
| K$_2$O | 5.9% |
| B$_2$O$_3$ | 3.3% |
| Al$_2$O$_3$ | 7% | which gave a molar ratio between the modifying oxides and the forming oxides (P$_2$O$_5$ and B$_2$O$_3$) of about 1.02.

Carbon-carbon samples identical to those described in Example 2 were provided with an internal protection constituted by glasses 4 (Example 2) and 7 (samples I and II respectively) following the process described in Example 2.

The treated samples were kept in water at room temperature for 16 hours. The corrosion rates for the glasses, measured as a percentage of the weight loss, were:

| | |
|---|---|
| for samples I (glass 4) | 1.87%/hour |
| for samples II (glass 7) | 0.03%/hour. |

The presence of alumina substantially increased the resistance to corrosion by water.

The same samples were kept for 15 hours at 650° C. in air. The relative weight losses measured were as follows:

| | |
|---|---|
| for samples I (glass 4) | 0.38% |
| for samples II (glass 7) | 0.31%. |

It can be seen that the oxidation protection was retained (and even slightly improved) while substantially improving the moisture resistance.

The above examples have shown the effectiveness of the present invention in producing an effective internal oxidation protection and catalytic oxidation of carbon with a high resistance to corrosion by moisture.

This does not exclude the possibility of combining this internal protection with an external oxidation protection in the form of a surface coating fixed in the superficial pore space of the material. This external protection is effected, for example, by spraying or painting a composition in the form of a solution or suspension of external protection precursors which, after drying, undergo heat treatment. The composition containing the precursors for the external protection can be used after impregnation with the internal protection precursor composition and any required drying, the internal and external protections then being generated by the same heat treatment step.

In order to ensure physico-chemical compatibility between the internal and external protections, it is advantageous to use an analogous composition to the internal protection precursor impregnating composition for the external protection precursor composition. A variety of constituents can be added, in suspension or in solution, to provide the external protection with specific properties. Thus refractory oxides, for example colloidal silica (SiO$_2$), can be added to improve the resistance of the external protection to high temperatures, compared with the internal protection, thus broadening the working temperature range of the material.

We claim:

1. A process for the protection of a porous carbon-containing material against oxidation and catalytic oxidation of carbon, comprising the steps consisting of:

preparing an aqueous solution containing the precursors of a glass-containing phosphate base modified at least by the presence of zinc oxide;

impregnating the porous material with the aqueous solution such that it penetrates the accessible pore space of the material;

drying the impregnated material; and carrying out heat treatment to form an internal coating which protects against oxidation, constituted by said modified phosphate glass-containing base, characterized in that:

the precursors are introduced into the aqueous solution so as to allow the formation of a glass-containing base in which the molar ratio between the glass modifying oxides, comprising zinc oxide, and the glass forming oxides, principally comprising or consisting of phosphoric anhydride, is sufficiently high to confer a resistance to corrosion by moisture on the glass-containing phosphate base, and the solution is formed by firstly dissolving in water, a polyphosphate which can then allow the required quantity of precursor salts of the modifying oxides comprising at least one zinc salt to dissolve to form a stable solution without the formation of a precipitate.

2. A process according to claim 1, characterized in that the precursors are introduced into the aqueous solution so as to allow the formation of a glass-containing phosphate base in which the molar ratio between the modifying oxides and the forming oxides is at least 0.6.

3. A process according to claim 1, characterized in that the precursors are introduced into the aqueous solution so as to allow the formation of a glass-containing phosphate base in which the molar ratio between the modifying oxides and the forming oxides is at least 0.9.

4. A process according to claim 1, characterized in that the first polyphosphate to be dissolved is a polyphosphate selected from sodium metaphosphate and sodium trimetaphosphate.

5. A process according to claim 1, characterized in that the zinc salt is introduced second into the aqueous solution.

6. A process according to claim 1, characterized in that the zinc salt introduced into the aqueous solution is at least one of the salts constituted by zinc nitrate and zinc sulfate.

7. A process according to claim 1, characterized in that the proportion of precursors in the solution is greater than or equal to 50% by weight.

8. A process according to claim 1, characterized in that the viscosity of the aqueous solution is in the range 0.1 dPa.s to 10 dPa.s.

9. A process according to claim 1, characterized in that the solution is acidic.

10. A process according to claim 9, characterized in that the solution has a pH of less than 0.5.

11. A process according to claim 1, characterized in that the acidity is controlled by addition of oxide precursors.

12. A process according to claim 1, characterized in that at least one precursor salt of a metallic oxide is introduced into the solution, which metallic oxide is selected from copper, cobalt, nickel, iron, magnesium and lead oxides.

13. A process according to claim 12, characterized in that copper sulfate is introduced into the solution as a precursor of copper oxide.

14. A process according to claim 1, characterized in that at least one precursor of lithium oxide and of potassium oxide is introduced into the solution.

15. A process according to claim 1, characterized in that at least one precursor of bismuth oxide, of aluminium oxide and of boron oxide is introduced into the solution.

16. A process according to claim 1, characterized in that at least one precursor of vanadium oxide and of titanium oxide is introduced into the solution.

17. A process according to claim 1, characterized in that at least one organic stabilizing agent with a fugitive nature is added to the solution of precursors.

18. A process according to claim 17, characterized in that the fugitive stabilizing agent is selected from oxalic, tartaric and citric acids.

19. A process according to claim 1, characterized in that a phosphoric anhydride precursor is added to the solution, with the exception of phosphoric acid.

20. A process according to claim 19, characterized in that the phosphoric anhydride precursor is ammonium phosphate.

21. A process according to claim 1, characterized in that the heat treatment is carried out in a nitriding atmosphere.

22. A process according to claim 1, characterized in that it further comprises the formation of an external protective coating against oxidation fixed in the surface pore space of the material.

23. A process according to claim 22, characterized in that the formation of the external coating comprises depositing a composition containing precursors for the external coating on the surface of the material.

24. A process according to claim 23, characterized in that the composition containing the precursors for the external protection is formed from the aqueous solution containing the precursors for the internal protection.

25. A process according to claim 24, characterized in that the composition containing the precursors for the external protection further comprises colloidal silica.

26. A porous carbon-containing material provided with an internal oxidation protection and active oxidation of carbon, the internal protection being constituted by a layer fixed in the accessible open pore space of the material and formed by a glass-containing phosphate base modified at least by the presence of zinc oxide, characterized in that the glass-containing base has the following composition, in mole percentages of oxides:

20% to 60% of $P_2O_5$;

10% to 30% of ZnO;

10% to 30% of $Na_2O$;

0 to 20% of at least one oxide selected from CuO, CoO, NiO, FeO, MgO and PbO;

0 to 15% of at least one alkali metal oxide selected from $Li_2O$ and $K_2O$;

0 to 20% of at least one oxide selected from $Bi_2O_3$, $Al_2O_3$ and $B_2O_3$; and 0 to 5% of at least one oxide selected from $V_2O_5$ and $TiO_2$.

with a molar ratio between the modifying oxides, comprising zinc oxide, and the forming oxides, principally comprising or consisting of phosphoric anhydride, which is sufficiently high to confer a resistance to corrosion by moisture on the glass-containing phosphate base.

27. A material according to claim 26, characterized in that the composition of the glass-containing base, as a mole percentage of oxides, is as follows:

20% to 50% of $P_2O_5$;

10% to 30% of ZnO;

10% to 30% of $Na_2O$;

0 to 20% of at least one oxide selected from CuO, CoO, NiO, FeO, MgO and PbO;

0 to 15% of at least one alkali metal oxide selected from $Li_2O$ and $K_2O$;

0 to 15% of at least one oxide selected from $Bi_2O_3$, $Al_2O_3$ and $B_2O_3$; and 0 to 5% of at least one oxide selected from $V_2O_5$ and $TiO_2$.

28. A material according to claim 26, characterized in that said molar ratio is at least 0.6.

29. A material according to claim 28, characterized in that said molar ratio is at least 0.9.

\* \* \* \* \*